Nov. 3, 1970     R. L. RISBERG     3,538,404
TORQUE REGULATING PULSE MODE D.C. MOTOR CONTROL USING THE
MOTOR IN THE REGENERATING OR MOTORING MODES
Filed Oct. 26, 1967     3 Sheets-Sheet 3

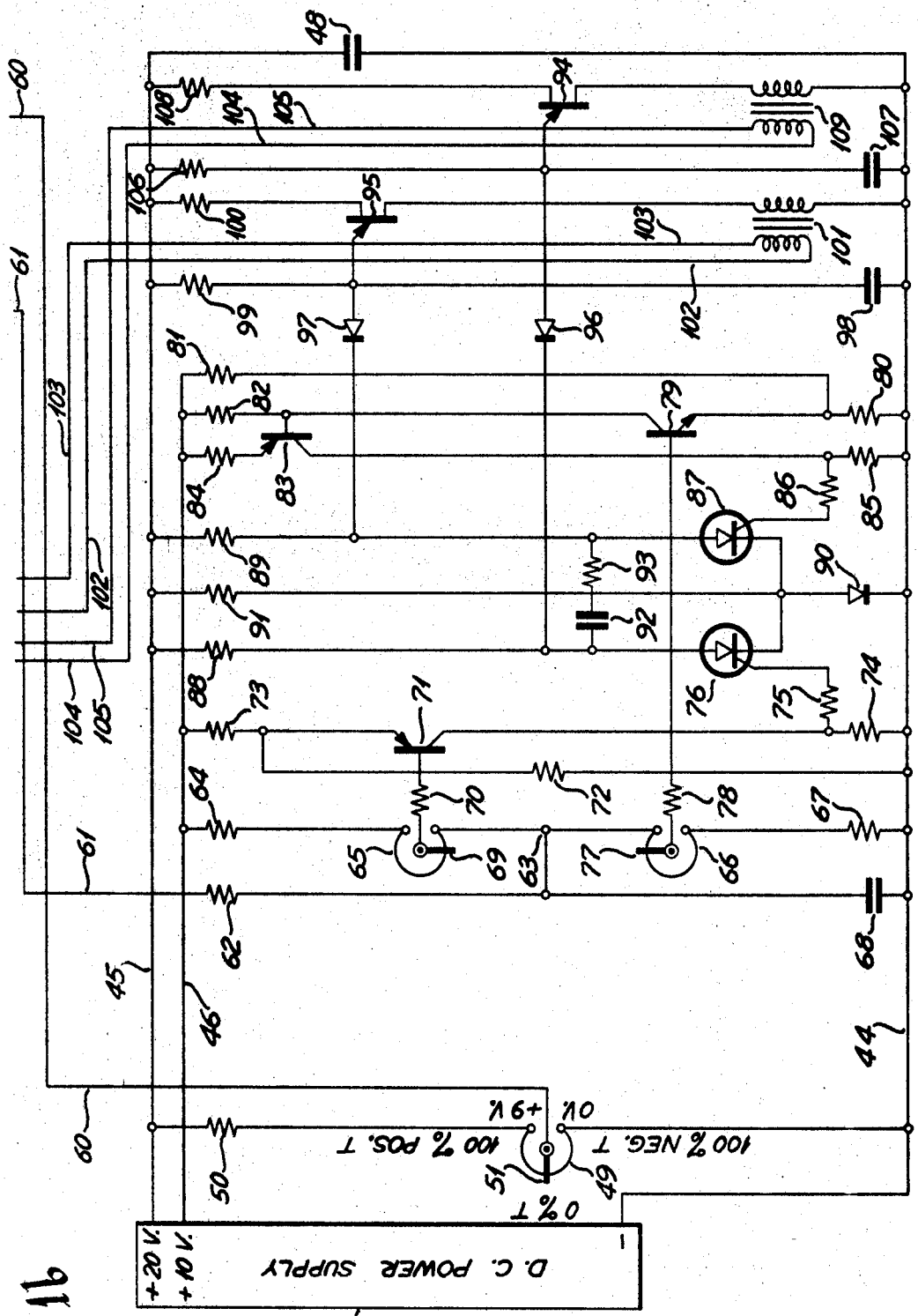

United States Patent Office 3,538,404
Patented Nov. 3, 1970

3,538,404
TORQUE REGULATING PULSE MODE D.C. MOTOR CONTROL USING THE MOTOR IN THE REGENERATING OR MOTORING MODES
Robert L. Risberg, Milwaukee, Wis., assignor to Cutler-Hammer, Inc., Milwaukee, Wis., a corporation of Delaware
Filed Oct. 26, 1967, Ser. No. 678,250
Int. Cl. B65h 77/00
U.S. Cl. 318—6                5 Claims

ABSTRACT OF THE DISCLOSURE

An electric motor and control system for tension control which includes a main D.C. motor and rectifier power supply therefor, a D.C. drag motor for a supply reel and a torque regulating control for the drag motor including pulse mode current control and means for feeding current regenerated by the drag motor back into the power supply for the main motor.

BACKGROUND OF THE INVENTION

The invention relates to chopper type or pulse mode control of D.C. motors and more specifically to pulse mode control of overhauling motors such as drag motors on the feed reels of coil fed steel sheet processing machinery.

The copending application by Robert L. Risberg, Ser. No. 637,530, filed May 10, 1967 disclosed an overhauling load energy dissipating chopper type current control system for D.C. motors. The present invention utilizes a somewhat similar type of control system in a motor torque control system in an installation including another D.C. motor which may be used to absorb the regenerated energy to increase the efficiency and economy of the installation.

SUMMARY OF THE INVENTION

It is an object of the invention to provide an economical and efficient pulse mode motor control for a D.C. motor in a rectifier fed multiple motor system.

It is a further object of the invention to provide a control system of the aforedescribed type in which the D.C. motor to be controlled is a motor which operates frequently in the regenerative state whereby the electrical energy thereby produced may be fed into the power supply to another larger motor.

These objects are accomplished by providing a variable rectifier power supply for a main electric motor. The power supply further furnishes power to a bilateral chopper type control for a second smaller D.C. motor whereby power regenerated by the second motor may be "pumped back" for use by the first motor. Further, control means are provided for controlling the torque of the second motor. More specifically where the second motor is a drag motor on a feed reel of a coil supplied machine, control means are provided for sensing the tension in the supplied material and controlling the torque of the motor to thereby regulate the tension in the material.

BRIEF DESCRIPTION OF THE DRAWINGS

FIGS. 1a and 1b, taken together, form a diagram of an electric motor control system embodying the invention;

DESCRIPTION OF THE PREFERRED EMBODIMENT

Figure 1A:
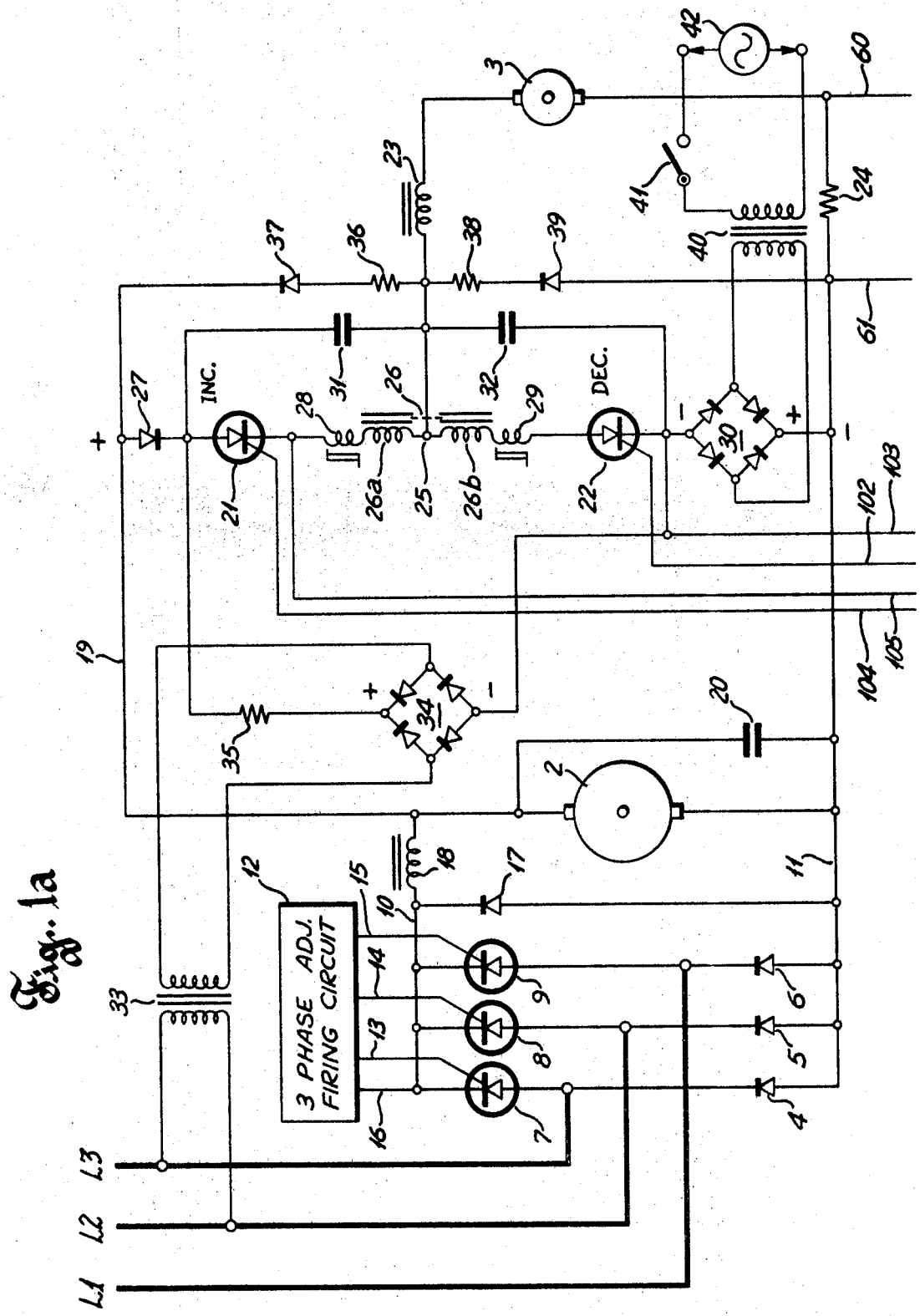

Referring to the drawings, there is shown a motor control system including a direct current main motor 2 and a direct current drag motor 3. In a typical installation the ratio of their sizes might be ten to one. For instance main motor 2 could be 250 horsepower while drag motor 3 could be 25 horsepower.

The electrical power for the motor system is obtained from a three phase A.C. source comprising lines L1, L2 and L3. A conventional three phase controlled bridge rectifier comprising diode rectifiers 4, 5 and 6 and silicon controlled rectifiers 7, 8 and 9 provide an output of direct current in a positive conductor 10 and a negative conductor 11.

A conventional adjustable three phase firing circuit 12 is connected to each of the gates of silicon controlled rectifiers 7, 8 and 9 by conductors 13, 14 and 15, respectively. A conductor 16 completes the gating circuits to the cathodes of silicon controlled rectifiers 7, 8 and 9. Firing circuit 12 is adjustable to gate silicon controlled rectifiers at the desired phase angle in each phase so as to permit conduction during adjustable portions of half cycles of current in each phase of the three phase input. The D.C. output voltage is thereby selectively varied.

A "free wheeling" diode 17 protects the rectifier bridge from reverse voltages and helps protect against misfiring the silicon controlled rectifiers 7, 8 and 9. An inductor 18 connects conductor 10 to a positive conductor 19. Main motor 2 is connected across conductors 19 and 11. A capacitor 20 is connected in parallel with motor 2 and together with inductor 18 serves to smooth the D.C. output of the three phase rectifier bridge.

The drag motor 3 is connected to conductors 19 and 11 through a chopper type circuit comprising a pair of silicon controlled rectifiers 21 and 22. An inductor 23 is placed in series with motor 3. A current sensing resistor 24 is placed in series with motor 3 and the other main power conductor 11 to motor 3. The power circuit to motor 3 then connects from conductor 11 through resistor 24, motor 3 and inductor 23 and then connects with a mid-point 25 in the chopper circuit. The mid-point 25 is at the center tap of a commutating inductor 26 having windings 26a and 26b which are wound on a common core. Inductor 26 obviously need not be of the center tapped variety but windings 26a and 26b could be separate windings. Further, windings 26a and 26b could be on the opposite sides of the respective silicon controlled rectifiers 21 and 22 in series circuit therewith. Specifically winding 26a could be connected to the anode side of silicon controlled rectifier 21 and winding 26b could be connected to the cathode side of silicon controlled rectifier 22.

As preferably illustrated one leg of the power conducting circuit runs from positive conductor 19 through a diode 27, silicon controlled rectifier 21, a saturating reactor 28 and winding 26a to mid-point 25. The other leg runs from mid-point 25 through winding 26b, a saturating reactor 29, silicon controlled rectifier 22 and a rectifier bridge 30 to negative conductor 11.

A commutating capacitor 31 is connected from the anode of silicon controlled rectifier 21 to mid-point 25. Similarly, a commutating capacitor 32 is connected from mid-point 25 to the cathode of silicon controlled rectifier 22.

A circuit for precharging capacitors 31 and 32 is connected to the anode of silicon controlled rectifier 21 and the cathode of silicon controlled rectifier 22. This precharging circuit insures proper charging of capacitors 31 and 32 regardless of the voltage on conductors 19 and 11. A transformer 33 has its primary supplied from power lines L2 and L3. The secondary of transformer 33 is connected to the input terminals of a bridge rectifier 34. The positive output terminal of bridge 34 is connected through a resistor 35 to the anode of silicon controlled rectifier 21. The negative output terminal of bridge 34 is connected to the cathode of silicon controlled rectifier 22. Diode 27 and bridge rectifier 30 are poled to prevent the precharging current from bridge 34 from flowing to the D.C. power conductors 19 and 11.

A resistor 36 and a diode 37 are connected in series from mid-point 25 to conductor 19. Similarly a resistor 38 and a diode 39 are connected from mid-point 25 to conductor 11.

Provision is made for slow speed reverse operation of drag motor 3 by introduction of a D.C. voltage between the cathode of silicon controlled rectifier 22 and conductor 11. The effect of this circuit will be more fully explained later. The negative terminal of bridge 30 is connected to the cathode of silicon controlled rectifier 22 and the positive terminal to conductor 11. The A.C. input terminals of bridge 30 are connected to the secondary of transformer 40. The primary of transformer 40 is supplied through switch 41 by an A.C. source 42. It can be seen that with switch 41 open, bridge 30 acts simply as a unidirectional conducting member similar to diode 27. When switch 41 is closed, bridge 30 additionally supplies a D.C. voltage at its terminals.

FIG. 1b illustrates a current regulating firing circuit for the control of silicon controlled rectifiers 21 and 22.

A D.C. power supply 43 has a negative terminal connected to a negative conductor 44, a positive 20 volt terminal connected to a positive 20 volt conductor 45, and a positive 10 volt terminal connected to a positive 10 volt conductor 46. A smoothing capacitor 48 is connected between conductors 45 and 44.

Figure 2:
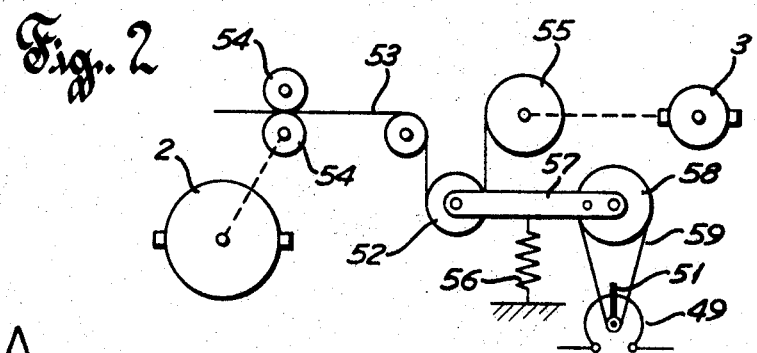
FIG. 2 shows a portion of the system as applied to a coil fed machine.

A torque setting variable potentiometer 49 is connected in series with a resistor 50 between conductors 44 and 45. As shown in FIG. 2, slider 51 may be mechanically coupled to a dancer roll 52 to sense the tension in a strip of material 53 such as a sheet of steel in a steel processing machine. As shown, main motor 2 drives a pair of pincer rolls 54 which pull strip 53 over a roll. A loop in the strip passes around dancer roll 52. The strip 53 is pulled from a feed roll 55 which is mechanically coupled to drag motor 3. As the tension in strip 53 increases, dancer roll 52 is pulled upwardly against the tension of a spring 56. A lever 57 connected to a pulley 58 rotates the pulley 58 and through a belt 59 serves to rotate slider 51. As can be seen when tension is increased in strip 53, slider 51 rotates clockwise.

When tension decreases, slider 51 rotates counterclockwise. The potentiometer 49 with its slider 51 therefore serves to sense the tension in strip 53.

Slider 51 is connected through a conductor 60 to the conductor between the drag motors and resistor 24. The other side of resistor 24 is connected to a conductor 61 which leads through a resistor 62 to a center point 63 of a voltage divider consisting of a resistor 64, a potentiometer 65, a potentiometer 66 and a resistor 67 which extends between conductor 46 and conductor 44. A capacitor 68 is placed between center point 63 and conductor 44. The combination of resistor 62 and capacitor 68 serves to filter out undesired transients or noise from the motor current signal carried by conductor 61.

A slider 69 on potentiometer 65 is connected through a base resistor 70 to the base of a PNP transistor 71. The emitter of transistor 71 is connected to the junction between resistors 72 and 73 which are connected in series across conductors 44 and 46. A load resistor 74 is connected between conductor 44 and the collector of transistor 71. A resistor 75 connects the collector of transistor 71 to the gate of a silicon controlled rectifier 76.

A slider 77 on potentiometer 66 is connected through a base resistor 78 to the base of an NPN transistor 79. The emitter of transistor 79 is connected to the juncture point between resistors 80 and 81 which are connected in series across conductors 44 and 46. A load resistor 82 connects the collector of transistor 79 to conductor 46. The collector of transistor 79 is also connected to the base of a PNP transistor 83 which serves to invert the signal from transistor 79. The emitter of transistor 83 is connected through a resistor 84 to conductor 46. A load resistor 85 is connected between the collector of transistor 83 and conductor 44. A resistor 86 connects the collector of transistor 83 to the gate of a silicon controlled rectifier 87.

Silicon controlled rectifiers 76 and 87 with the associated circuitry comprise a commutated switching circuit of a well known type in which silicon controlled rectifiers 76 and 87 are rendered alternately conductive. The anodes of silicon controlled rectifiers 76 and 87 are connected to conductor 45 through load resistors 88 and 89, respectively. The cathodes of silicon controlled rectifiers 76 and 87 are connected together and to conductor 44 through a diode 90. A resistor 91 is connected between conductor 45 and the cathodes of silicon controlled rectifiers 76 and 87. Resistor 91 and diode 90 furnish a small reverse bias to the cathode to gate circuits of silicon controlled rectifiers 76 and 87. A commutating capacitor 92 and a series resistor 93 are connected between the anodes of silicon controlled rectifiers 76 and 87. As is well known the circuit just described causes one of silicon controlled rectifiers 76 and 87 to be turned off when the other is fired. For instance, if silicon controlled rectifier 76 is conducting, and silicon controlled rectifier 87 is nonconducting, capacitor 92 charges through resistor 89, resistor 93, silicon controlled rectifier 76 and diode 90. When silicon controlled rectifier 87 is fired, the discharge of capacitor 92 causes a sudden voltage drop at the anode of silicon controlled rectifier 76 sufficient to turn it off.

The anodes of silicon controlled rectifiers 76 and 87 are connected to the emitters of unijunction transistors 94 and 95 by diodes 96 and 97, respectively, to thereby control the operation of a corresponding pair of identical unijunction transistor relaxation oscillators of a well known type. A capacitor 98 connected to conductor 44 charges through a resistor 99 which connects to conductor 45. The junction between resistor 99 and capacitor 98 is connected to the emitter of unijunction transistor 95. The base circuit extends from conductor 45 through a resistor 100, base two and base one of unijunction transistor 95 and the primary winding of a pulse transformer 101 to conductor 44. When capacitor 98 charges sufficiently to cause the emitter of unijunction transistor 95 to reach the critical voltages, capacitor 98 discharges through the emitter and current flows through the primary of transformer 101 to cause a pulse to be delivered from the secondary of transformer 101 to a pair of conductors 102 and 103. Conductors 102 and 103 are connected to the gate and cathode, respectively, of silicon controlled rectifier 22 to deliver gating pulses thereto. The oscillator just described will continue to deliver gating pulses until silicon controlled rectifier 87 is rendered conductive to effectively shunt capacitor 98 to stop the oscillator.

Similarly, silicon controlled rectifier 21 receives gating pulses through a pair of conductors 104 and 105 from a similar relaxation oscillator comprising a resistor 106, a capacitor 107, a resistor 108 and a pulse transformer 109. This latter oscillator will deliver gating pulses as long as silicon controlled rectifier is nonconductive.

The operation of the entire system will now be described.

For purposes of this description a positive motor current will be defined as the current flowing through motor 3 when it is motoring rather than regenerating. In other words, a positive motor current flows from mid-point 25 through inductor 23, motor 3 and resistor 24 to negative conductor 11. This current gives rise to a signal voltage across resistor 24 which is positive in conductor 60 with respect to conductor 61. The oppositely flowing current or negative motor current is the regenerative current. Any reference to increasing current is intended to describe a change in current in the positive direction even though the direction of flow may at the time be in the negative direction.

When motor 3 is motoring in a forward direction and producing a positive torque, current flows through motor 3 in a direction from inductor 23 to resistor 24. Power is applied thereto by firing silicon controlled rectifier 21. Silicon controlled rectifier 22 is then nonconductive and current flows from conductor 19 through silicon controlled rectifier 21 to mid-point 25 and thence through inductor 23, motor 3 and resistor 24 to conductor 11. This motoring current increases at a rate inversely proportional to the reactance of the circuit. Silicon controlled rectifier 21 may therefore be referred to as the Increase SCR.

Figure 3:
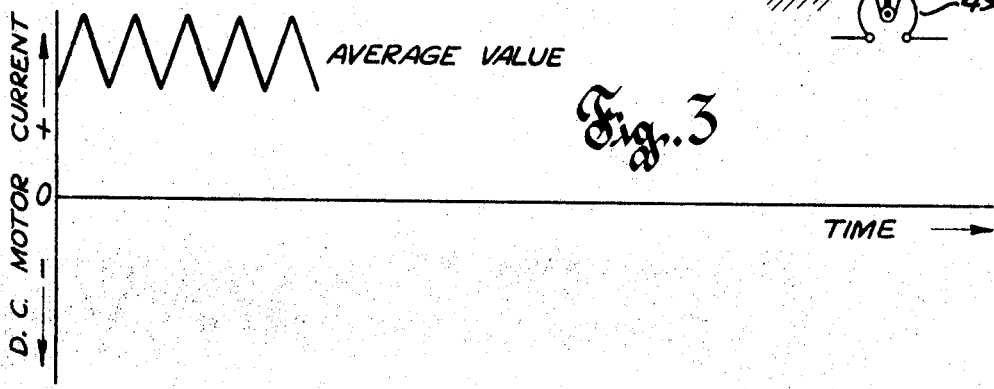
FIGS. 3, 4 and 5 illustrate graphically current regulation under various conditions of operation.

When the magnitude of the current as sensed by resistor 24 reaches a desired upper limit as determined by the setting of potentiometer 65 and firing circuit of FIG. 1b is effective to fire silicon controlled rectifier 22 which may be referred to as the Decrease SCR. The operation of the level detecting and firing circuit will be described later in more detail. The firing of Decrease SCR 22 causes capacitor 32 to discharge through commutating inductor winding 26b. A voltage is induced in winding 26a to reverse bias Increase SCR 21 to turn it off. The induced current through motor 3 and inductor 23 then flows through resistor 24, diode 39 and resistor 38 in a closed loop. The current is dissipated by the resistance of the circuit and will decrease as sensed by resistor 24 to a minimum value determined by the setting on potentiometer 66. The Increase SCR 21 is then fired. Capacitor 31 is discharged through winding 26a and the voltage induced in winding 26b turns off Decrease SCR 22. The motor current then increases as previously described. The process continues and the motor current alternately increases and decreases in a saw tooth fashion between limits as set by potentiometers 65 and 66 around an average current value as set by potentiometer 49 as shown in FIG. 3.

Figure 4:
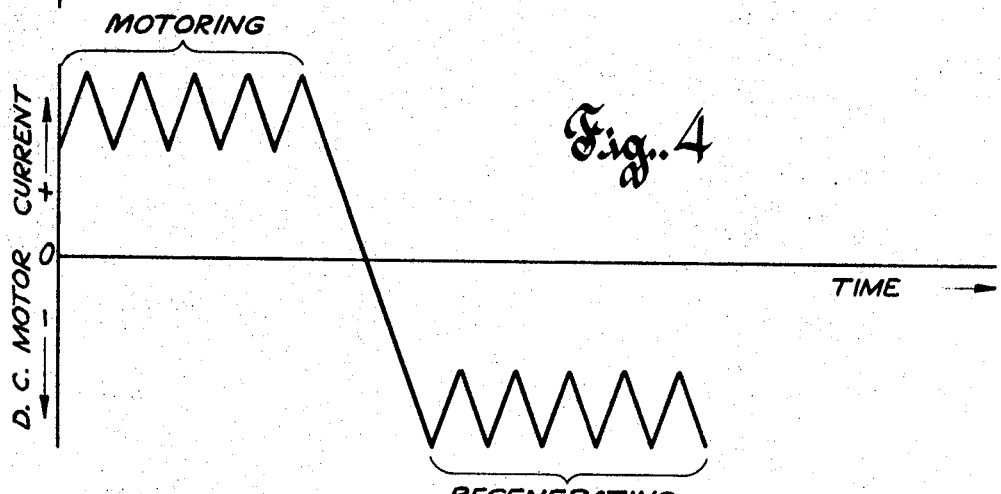

When motor 3 is operated in the regenerative mode as a drag motor, the direction of current flow reverses through motor 3 as shown in FIG. 4. Assume that Decrease SCR 22 is rendered conductive, the regenerative current flow will be from motor 3 through inductor 23, mid-point 25, Decrease SCR 22, bridge 30 and resistor 24 to motor 3. The current will decrease, that is, become of greater magnitude in the negative direction, to a lower limit as set by potentiometer 66 at which point Increase SCR 21 is fired. Decrease SCR 22 is consequently commutated off. The counter voltage across motor 3 is additive to the voltage induced in inductor 23 and the total voltage is greater than the power supply voltage across conductors 19 and 11. Current therefore flows back to the supply for motor 2 through resistor 36 and diode 37. The current will decay to cause the motor current to increase (change toward the positive) to a maximum value as set by potentiometer 65. Decrease SCR 22 is then refired, Increase SCR 21 is turned off and the process repeats. The current is thereby regulated in a saw tooth manner about a negative overage value and the regenerated power is pumped back through resistor 36 and diode 37. Switching rates of Increase SCR 22 and Decrease SCR 21 up to 400 cycles per second are normally encountered.

Closure of switch 41 introduces a relatively small reverse voltage into the loop comprising Decrease SCR 22 to enable the drag motor 3 to be run slowly in the reverse direction or to furnish a negative torque when stalled in order to apply tension to the strip material before starting the strip fed machine. The operation of this circuit is also discussed in the aforementioned application Ser. No. 637,530.

The operation of the level detection and firing circuit shown in FIG. 1b will now be described.

Potentiometers 65 and 66 are effective to set the upper and low limits, respectively, of the zone in which the motor current or torque is regulated. Potentiometer 49 is effective to set the mid-point of the zone or in other words to select the mean value of torque desired. Potentiometer 49 may be mechanically coupled to a dancer roll 52 as shown in FIG. 2 to regulate tension.

Potentiometer 65 sets the upper limit of the zone. The values of resistors 72 and 73 and the setting of potentiometer 65 may be chosen so that transistor 71 becomes conductive when the voltage at point 63 decreases to 4 volts as would be caused by a motor torque increase. For instance, assuming a positive 4.5 volt setting on slider 51, an increase in torque or motor current would cause a voltage drop in resistor 24 which would subtract from the 4.5 volts and would eventually bring point 63 to a positive 4 volts. When this occurs a positive gating current is applied to silicon controlled rectifier 76 to render it conductive. This effectively clamps the emitter unijunction transistor 94 to prevent oscillation of the associated relaxation oscillator circuit thereby preventing the gating of Increase SCR 21. Simultaneously silicon controlled rectifier 87 is rendered nonconductive to permit oscillation of the relaxation oscillator including unijunction transistor 95. Gating pulses are therefore delivered to Decrease SCR 22 to cause the motor current and torque to decrease as heretofore described.

Potentiometer 66 on the other hand sets the lower limit of the zone. The setting may be chosen so that transistor 79 turns on as the signal voltage at point 63 increases to 5 volts as caused by decreasing motor current. Transistor 83 inverts the output of transistor 79 to apply a gating current to silicon controlled rectifier 87 to render it conductive. The emitter of unijunction transistor 95 is thereby clamped to stop gating pulses to the Decrease SCR 22. Simultaneously, silicon controlled rectifier 76 is turned off to free the relaxation oscillator including unijunction transistor 94. Gating pulses are then delivered to the Increase SCR 21 to cause the motor current to increase as heretofore described.

Potentiometer 49 is effective to set the desired torque. As indicated in FIG. 1b, a 9 volt differential exists across potentiometer 49. If potentiometers 66 and 65 are set for a 4 to 5 volt signal zone as described, the mid-point setting of potentiometer 49 will deliver 4.5 volts and will be equivalent to a zero torque setting since the control circuit will control the motor current to a zero mean value in order to maintain a mean zero drop across resistor 24 which will result in a 4.5 mean signal voltage at point 63.

Figure 5:
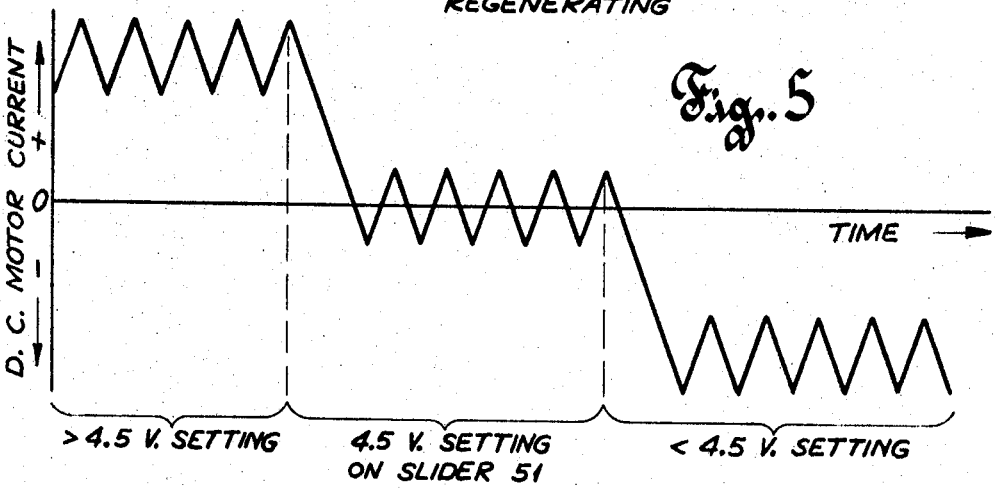

Rotation of slider 51 to the right will cause an increase in the torque setting and conversely the opposite rotation results in a negative torque setting. For instance, if the slider voltage is increased above 4.5 volts, a positive mean motor current is required to bring the signal voltage at point 63 back down to the required mean of 4.5 volts. FIG. 5 illustrates the motor current with three settings of slider 51.

The arrangement shown in FIG. 2 is therefore effective to regulate the tension in the strip 53. If tension increases above the desired value, dancer roll 52 is pulled upwardly, pulley 58 rotates to the right and slider 51 moves to the right to cause an increase in torque. As herein defined this increase in torque is in the motoring direction and therefore results in a decrease in tension. Conversely the lowering of dancer roll 52 causes the tension to increase.

What is claimed is:
1. An electric motor and control system comprising:
   main D.C. motor means;
   D.C. power supply means for said main D.C. motor means including first and second D.C. conductors supplying power to said main D.C. motor;
   a second D.C. motor of smaller size than said main motor; and power supply and regulating means for said second motor comprising:
first and second circuit legs which include respective first and second controlled rectifier means, said first and second legs being connected in a series circuit from said first conductor to said second conductor and being connected together at a mid-point;
inductor means connected in series with said second motor in a circuit from said mid-point to said second conductor;
commutating means for turning off one of said first and second controlled rectifier means when the other is fired;
feedback circuit means from said mid-point to said first conductor comprising unidirectional conducting means in parallel circuit relationship with said first controlled rectifier means but poled oppositely;
additional circuit means connected in parallel with said second circuit leg between said mid-point and said second conductor comprising unidirectional conducting means poled oppositely to said second controlled rectifier means, and
control means for alternately firing said first and second controlled rectifier means whereby when said motor is in a regenerative mode of operation, firing of said second controlled rectifier means causes regenerated current to flow from said motor through said inductor means and said second controlled semiconductor means, and the subsequent firing of said first controlled semiconductor means turns off said second controlled semiconductor means and the combined countervoltage of said second motor and the induced voltage of said series connected inductor means exceeds the voltage between said first and second D.C. conductors to cause regenerated current flow through said feedback circuit means between said mid-point and said first D.C. conductor for use by said first D.C. motor, said additional circuit means when said second D.C. motor is operating in a motoring mode and said first controlled rectifier means is non conductive providing induced current flow through said inductor means and said second D.C. motor.

2. The invention as defined in claim 1 in which:
said first motor is a main motor for a reel feed processing machine;
said second motor is a drag motor coupled to the reel feeding mechanism of said machine; and
said control means comprises:
torque sensing means for sensing the torque of said drag motor;
tension measuring means for measuring the tension in the material fed from said reel feeding mechanism and providing a signal determined by the relationship of the measured tension to a desired tension; and
means for alternately firing said first and second controlled rectifier means to regulate the torque as sensed by said torque sensing means about a set point determined by said signal from said tension measuring means.

3. The invention as defined in claim 2 in which said torque sensing means comprises means for sensing the current in said drag motor.

4. The invention as defined in claim 2 in which said tension measuring means comprises an idler roll in said machine.

5. The invention as defined in claim 1 in which:
said D.C. power supply means for said main D.C. motor is a variable D.C. source;
said first and second controlled rectifier means comprise silicon controlled rectifiers;
said commutating means comprises inductor means with magnetically coupled first and second windings respectively connected in series with said silicon controlled rectifiers in each of said first and second circuit legs, and first and second commutating capacitors respectively connected in parallel circuits with said first and second circuit legs and in series circuit with each other; and
said invention further includes:
precharging means comprising a voltage source for charging said first and second capacitors connected across said series connected first and second commutating capacitors;
first voltage trapping unidirectional conducting means connected between said first conductor and said voltage source; and
second voltage trapping unidirectional conducting means connected between said second conductor and said voltage source;
each of said voltage trapping unidirectional conducting means being poled to prevent current flow from said voltage source to said first and second conductors.

References Cited
UNITED STATES PATENTS

| | | | |
|---|---|---|---|
| 3,086,156 | 4/1963 | Geissing | 318—308 |
| 3,250,978 | 5/1966 | Moscardi | 318—345 |
| 3,292,022 | 12/1966 | Foreman | 318—6 |
| 3,373,331 | 4/1968 | Dow | 318—331 |
| 3,384,812 | 5/1968 | Iuy | 318—332 XR |

ORIS L. RADER, Primary Examiner

ALFRED G. COLLINS, Assistant Examiner

U.S. Cl. X.R.
318—345, 376